United States Patent [19]

Thomason et al.

[11] 4,139,055
[45] Feb. 13, 1979

[54] SOLAR HEATING (COOLING)

[76] Inventors: Harry E. Thomason; Harry J. L. Thomason, Jr., both of 6802 Walker Mill Rd., SE., Washington, D.C. 20027

[21] Appl. No.: 696,916

[22] Filed: Jun. 17, 1976

[51] Int. Cl.² .............................................. F28D 21/00
[52] U.S. Cl. ................................. 165/96; 165/104 S; 237/1 A; 237/19; 126/400
[58] Field of Search ................. 165/48, 18, 104 S, 96; 237/1 A, 19; 126/271, 400

[56] References Cited

U.S. PATENT DOCUMENTS

| | | | |
|---|---|---|---|
| 1,425,174 | 8/1922 | Cartter et al. ....................... 126/271 |
| 1,696,003 | 12/1928 | Harvey ................................. 126/271 |
| 1,988,263 | 1/1935 | Casserly .............................. 237/19 X |
| 2,204,708 | 6/1940 | Smith ................................... 237/19 X |
| 2,553,302 | 5/1951 | Cornwall ........................... 126/271 X |
| 3,236,294 | 2/1966 | Thomason ............................. 165/48 |
| 3,254,702 | 6/1966 | Thomason ............................. 165/48 |
| 3,254,703 | 6/1966 | Thomason ............................. 165/48 |
| 4,000,851 | 1/1977 | Heilemann ....................... 126/271 X |

Primary Examiner—Albert W. Davis, Jr.

[57] ABSTRACT

In the present invention, a plurality of containers provide for heat storage in water or other fluids, or solids, or both, plus domestic water heating. There is good quality heat exchange going in to storage and going out to points of use. Space heating may be accomplished by hot air, or by hot water or other liquid, or both.

4 Claims, 1 Drawing Figure

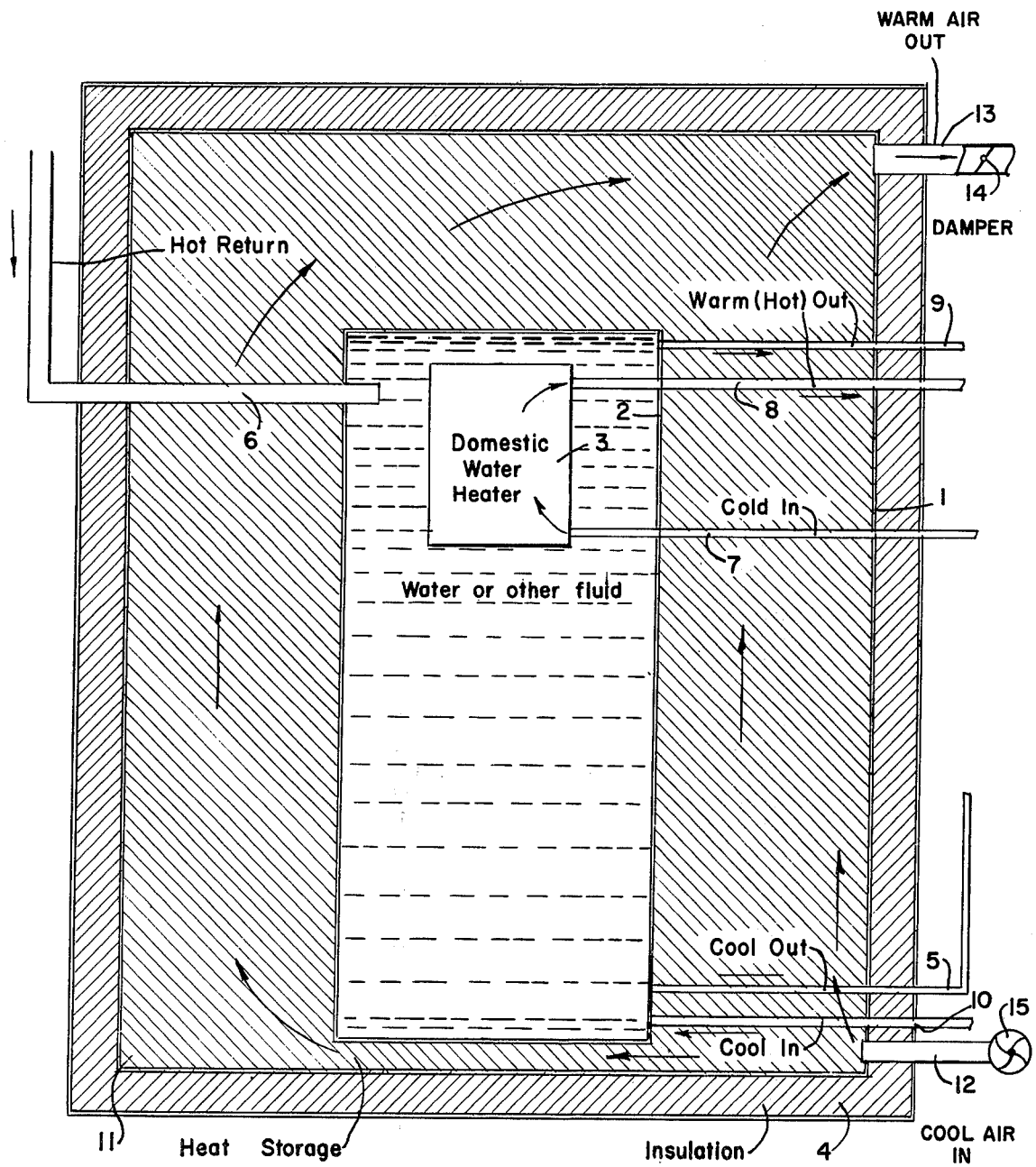

SOLAR HEATING (COOLING)

BACKGROUND

For storage of solar-produced heat, and cold, a tank of water (or other liquid) surrounded by a truckload of stones has proven very effective, and low in cost, see Thomason U.S. Pat. Nos. 3,254,702; 3,254,703; 3,295,591; 3,236,294; 3,369,541; 3,412,728; 3,812,903 (other Patents Pending by Thomason and Thomason). Many solar home heating systems are in existence and being built using those inventions.

In most instances a home that is already in existence uses hot air or hot water for home heating. Virtually all homes have running hot domestic water. And, in many cases, new homes are being built with baseboard hot water heat, or other types of hot water heat, or hot air.

Many inventors fail to realize the importance of getting solar-produced heat in to storage quickly, at the lowest temperature possible. The fluid being heated in the solar collectors should give up its heat to storage quickly, so that the fluid can return to the collectors at low temperature. That low temperature fluid, in turn, picks up more heat from the collectors. The collectors, in turn, operate at lower temperatures. Operating at lower temperatures, they are more efficient and obtain more free heat from the sun. The present invention gets the heat from the sun in to storage rapidly and efficiently, and then that heat is recovered from storage rapidly and efficiently.

Many apartment houses, office buildings, warehouses, factories, etc. use large quantities of warm or hot water for heating, processing, domestic purposes, etc. And, there are many other applications requiring warm or hot water.

Electricity to produce heat during off-peak periods can be obtained at half-price in many areas. In some other cases, off-peak energy (gas, etc.) is available to produce heat at low cost, if it can be stored for use later.

So, there is a need for warm and hot water, not only on sunny days but, by stored heat, on nights and cloudy days. Much of that need is for both Summer and Winter, plus Autumn and Springtime, that is, 365 days a year. Often there is also a need for hot air, or hot water space heating. The present invention fills those needs, at low costs.

IN THE DRAWING

The single FIGURE illustrates an embodiment of the invention.

An outer container 1 has a second container 2 therein with a third container 3 inside of container 2. Insulation 4 preferably substantially surrounds the containers. However, it may be inside of container 1, instead of on the outside.

Cool water (or other fluid) from near the bottom of container 2 flows to a source of heat through conduit 5. Such source of heat may be a solar heat collector, or other heat-producing apparatus. Warm or hot water returns at 6.

Cold water to be heated (such as city or well water) flows in at 7 to container 3. Warm or hot water in container 2 heats the water in container 3. The warmed water flows out at 8 to a point of usage. Or, it flows through an auxiliary heater to make it always hot, irrespective of heat input at 6 into container 2. That hot water is usually used for domestic purposes.

If warm or hot water is needed for other purposes it flows out at 9 and returns at 10 to container 2. Typically warm water flowing out at 9 will flow through radiators, baseboard or fan coil heaters or such, to warm a building. After its heat is removed it will flow back at 10 as cool water. Or, if the warm or hot water is used up, or consumed, as it flows out at 9, it will be replaced by cold makeup water coming in at 10.

Additional heat storage material is illustrated at 11. Large quantities of heat can be stored in material 11. That material may take various forms such as water, or other liquid, or solid, or pieces of solids, heat-of-fusion material, etc. If it be water, for example, it may contain a rust or corrosion-inhibitor, if needed. But, it need not contain anti-freeze because it does not circulate out to a heat collector where it could freeze. (Some solar collectors have freezing problems.) So, as heat is used from container 3, replacement heat will flow from the warm or hot fluid in container 2 to the fluid in container 3. That leaves the fluid cooler in container 2. Or, if heat is used directly from container 2, through conduits 8 and 10, fluid in container 2 becomes cooler. Then, heat from material 11 heats the fluid in container 2.

Solids, or chunks of solids, may be used as storage material 11, but, a liquid such as water has a higher specific heat, and also has good heat-transfer characteristics. That is, by "wetting" the outer surface of container 2, heat is rapidly transferred to the water. Then, convection currents in that liquid itself move the heat on out into the entire mass of heat storage material 11. Heat-of-fusion heat storage material used at 11 also has good properties such as high heat content, good heat transfer into and out of storage, etc.

It will be noted that heated fluid coming in to storage at 6 flows into the space between two containers 2 and 3. Therefore, the heat flows quickly in two directions, in to the fluid in container 3 and outward to the heat storage material 11 in container 1. Those two containers have large surface areas of contact with the heated fluid, thereby speeding up the heat-transfer process. So, quickly the heat is imparted, in both directions, to storage. The heated fluid cools down and returns by outlet 5 to the solar collectors, or other source of heat, for re-heating. That cooled fluid picks up more heat, more efficiently, from the solar collectors or other source of heat.

As suggested above, space heating of a home or other building may be obtained by using hot or warm water (or other liquid) from container 2 to warm radiators, convectors, fan coils, etc. However, in some instances hot air heat is needed or desired. Or, hot air heat may be used in addition to hot water heat. For such purposes, means is provided to circulate air through storage material 11 to warm it as it flows in through inlet conduit 12 and out through outlet conduit 13. Convection currents and natural flow will automatically transfer the heat out of storage to a considerable extent.

If there are times when no heat should flow out of storage, then a simple damper at 14 may be closed to stop convection currents.

If more rapid heat transfer out of storage is desired, a blower 15 may be started. Also, blower 15 may be used to force warm air out to distant rooms of a house (and return), or for other forced-air circulation.

This invention provides many good features. The containers are low in cost to fabricate. The heat storage material 11 is low in cost. Heat transfer is entirely automatic, flowing both into and out of storage. Large quantities of heat are transferred without additional heat exchangers. That is because of the large surfaces of the containers, and because each is "bathed" in warm or hot material.

As the fluid is being heated hour-by-hour in container 2, its heat flows into material 11 which "soaks up" very large quantities of heat and, therefore, warms up slowly. That stores away large quantities of heat in material that need not be circulated through the collectors.

A large quantity of already-heated water is available in container 3 for ready usage for baths, washing clothes, etc. That reserve eliminates the need for expensive large-area heat exchangers. And yet, the large surface area of container 3 causes relatively quick heating of cold water that flows thereinto as hot water is drawn therefrom.

A large quantity of already-heated fluid is available in container 2 for ready usage. It may be used to heat a home or other building, by circulating it to radiators or such, or it will heat cold city water coming into container 3.

A large quantity of heat is available from material 11. In some installations tank 1 and storage material 11 can be very large, to thereby store very large quantities of heat. That large quantity of heat is available to replenish heat used from inner container 2 or innermost container 3 or for direct use to heat air circulating through storage material 11.

In some original installations, and in some retrofitting of old houses and other buildings, both hot water and hot air may be needed (besides hot domestic water). Hot water heat for one room may be obtained by sending hot water from outlet 9 to the radiators. Hot air heat for another room may be obtained by sending hot air from outlet 13 to that room.

The drawing illustrates air or other fluid being circulated through storage material 11. Water or other liquid could be used — that is, any fluid could be used.

IN SUMMARY

It is apparent that the present invention provides for: 1. Hot domestic water, and 2. Hot water heat for radiators, etc., and 3. Hot air heat; or any one or two of those functions. That is important for versatility in new building construction and is all-the-more important for retrofitting or converting a building to solar heat, or to heat produced by conventional fuels at off-peak periods.

Although heat storage and recovery from storage is the primary thrust of the present invention it is obvious that cold storage could be obtained in similar apparatus. Perhaps "ice-water" would be needed, or chilled water for air conditioning, chilled in container 3. Coldness for storage could be produced during cool periods of the night. During off-peak periods electric power rates are low. Also, cooling can be accomplished with less electricity for the refrigerating apparatus during cooling night hours.

So, we have simple, low-cost heat and cold storage apparatus.

We claim:

1. Heat or cold storage apparatus comprising a first outer container, a second container in said first container, a third tank-like container in said second container, insulation means to reduce heat or cold transfer into or out from said first outer container, and heat (cold) storage material in said first container substantially surrounding said second container, said heat (cold) storage material being in thermal communication with said second container to permit heat to flow from said second container to said heat (cold) storage material or from said heat (cold) storage material to said second container, inlet conduit connection means for said first container to admit fluid to be warmed and outlet conduit connection means for said first container to allow for exit of warmed fluid, said heat (cold storage material having passages therethrough allowing for circulation of fluid to be heated or cooled, means to retard or prevent flow of fluid through said first container when desired, conduit means connected to said third container to introduce liquid to be heated or cooled and to provide for exit of such liquid, and conduit means connected to said second container to provide for introduction of liquid and exit of liquid for storing heat or cold.

2. Apparatus as in claim 1 and additional conduit means to circulate fluid into and out of said second container.

3. Apparatus as in claim 1 and means to circulate air or other fluid to be heated (or cooled) through said first container to be warmed or cooled by said heat (cold) storage material.

4. Apparatus as in claim 1 and means to increase the flow of fluid through said first container when desired.

* * * * *